United States Patent
Barth et al.

(10) Patent No.: US 9,098,896 B2
(45) Date of Patent: Aug. 4, 2015

(54) METHOD FOR CORRECTING METAL ARTIFACTS IN X-RAY IMAGING, AND X-RAY DEVICE

(71) Applicant: SIEMENS AKTIENGESELLSCHAFT, Munich (DE)

(72) Inventors: Karl Barth, Hoechstadt (DE); Rainer Graumann, Hoechstadt (DE)

(73) Assignee: Siemens Aktiengesellschaft, Munich (DE)

(*) Notice: Subject to any disclaimer, the term of this patent is extended or adjusted under 35 U.S.C. 154(b) by 46 days.

(21) Appl. No.: 13/947,349

(22) Filed: Jul. 22, 2013

(65) Prior Publication Data
US 2014/0023290 A1 Jan. 23, 2014

(30) Foreign Application Priority Data
Jul. 20, 2012 (DE) .......................... 10 2012 212 774

(51) Int. Cl.
G06K 9/40 (2006.01)
G06T 5/00 (2006.01)
G06T 11/00 (2006.01)

(52) U.S. Cl.
CPC .............. *G06T 5/001* (2013.01); *G06T 11/005* (2013.01)

(58) Field of Classification Search
USPC ........... 382/275, 285, 254, 154, 132; 348/36, 348/E7.001, E13.022, E13.025; 703/6; 345/420
See application file for complete search history.

(56) References Cited

U.S. PATENT DOCUMENTS

| 5,694,533 A * | 12/1997 | Richards et al. .............. 345/420 |
| 7,428,482 B2 * | 9/2008 | Clavadetscher .................. 703/6 |
| 8,014,985 B2 * | 9/2011 | Clavadetscher .................. 703/6 |
| 8,094,928 B2 * | 1/2012 | Graepel et al. ................ 382/154 |

FOREIGN PATENT DOCUMENTS

| DE | 102009037251 A1 | 2/2011 | |
| WO | WO2005059592 | * 6/2005 | .............. G01T 1/164 |

* cited by examiner

*Primary Examiner* — Anh Do
(74) *Attorney, Agent, or Firm* — Laurence A. Greenberg; Werner H. Stemer; Ralph E. Locher

(57) ABSTRACT

Artifacts caused by at least one metal object in a target region to be imaged are corrected during the reconstruction of a three-dimensional image dataset from a number of two-dimensional projection images of the target region recorded from different projection directions with an x-ray device. An orientation and position of a three-dimensional model of the known metal object is determined in the coordinate system of the x-ray device via a 2D-3D registration with at least one two-dimensional projection image, after which, for each radiation path of the projection images running through the metal object, on the basis of attenuation information through the metal object assigned to the model, an attenuation portion through the metal object is calculated for the projection image data assigned to the radiation path and is obtained by computation for determining modified projection images from the projection image data. The three-dimensional image dataset is determined from the modified projection images.

20 Claims, 2 Drawing Sheets

METHOD FOR CORRECTING METAL ARTIFACTS IN X-RAY IMAGING, AND X-RAY DEVICE

CROSS-REFERENCE TO RELATED APPLICATION

This application claims the priority, under 35 U.S.C. §119, of German patent application DE 10 2012 212 774.7, filed Jul. 20, 2012; the prior application is herewith incorporated by reference in its entirety.

BACKGROUND OF THE INVENTION

Field of the Invention

The invention relates to a method for the correction of artifacts caused by at least one metal object in a target region of which an image is to be recorded in the reconstruction of a three-dimensional image dataset from a plurality of two-dimensional projection images of the target region recorded from different projection directions with an x-ray device. In addition the invention relates to an x-ray device.

The reconstruction of three-dimensional image datasets from two-dimensional projection images is a known method in tomographic imaging, especially also in x-ray imaging. In the process, projection images of a target region are recorded from different projection directions with an x-ray device, for example a computed tomography device or a C-arm x-ray device. For this purpose the x-ray emitter is usually moved along an imaging trajectory, for example a circular path around the object to be imaged, such as a patient. Different methods are known for determining a three-dimensional image dataset from the two-dimensional projection images by reconstruction.

The process of filtered back projection (FBP) is frequently used as an analytical method. In that process, after a filtering of the projection images, ultimately contributions of different radiation paths are summed into a voxel of the three-dimensional image dataset. In addition iterative methods are also known, in which a three-dimensional image dataset is adapted until such time as its forward projections reflect the projection images as precisely as possible.

The options afforded by these methods are frequently used in the field of medical imaging. A problem with such methods are metal objects present in patients, which in the three-dimensional image dataset, especially with C-arm imaging, can lead to significant artifacts. These make diagnosis, therapy planning and quality checking significantly more difficult and can also lead to misinterpretations. If for example a patient is examined in a target region in which a screw or another implant is used, the positions of screws in relation to surrounding bone structures can only be quantified very imprecisely. In particular the more immediate vicinity of the metal objects is only able to be imaged imprecisely as a result of the artifacts, so that it can frequently not be precisely established or quantified whether for example placed screws protrude into joint surfaces and the like. The reason for this can for example be overshoots, which in the ultimate image act as if there were a distance between the metal object and surrounding objects, for example bones.

To minimize the artifacts, the process of optimizing the choice of the imaging trajectory, for example of a plane of rotation of a C-arm, is applied nowadays. This is however greatly restricted, especially in its options as regards the limitation by the patient couch and the patients themselves. Further methods for reducing metal artifacts have also been proposed which however have not met expectations in respect of ability to be implemented or effectiveness.

SUMMARY OF THE INVENTION

It is accordingly an object of the invention to provide a method for correcting metal artifacts and an x-ray device which overcome the above-mentioned disadvantages of the heretofore-known devices and methods of this general type and which provides for the reduction of metal artifacts in three-dimensional reconstructions from projection images which, in an easy-to-implement manner, makes possible a significant reduction of metal artifacts.

With the foregoing and other objects in view there is provided, in accordance with the invention, a method for correcting artifacts caused by at least one metal object in a target region to be imaged during a reconstruction of a three-dimensional image dataset from a plurality of two-dimensional projection images of the target region recorded from mutually different projection directions with an x-ray device. The method comprises:

determining an orientation and a position of a three-dimensional model of the at least one metal object in a coordinate system of the x-ray device by way of a 2D-3D registration with a least one two-dimensional projection image;

for each radiation path of the projection images running through the metal object, based on attenuation information through the metal object assigned to the model, calculating a proportion of attenuation through the metal object for the projection image data assigned to the respective radiation path and using a result of the calculation to determine modified projection images from the projection image data; and determining the three-dimensional image dataset from the modified projection images.

In other words, the objects of the invention are achieved in that at least the orientation and position of a three-dimensional model of the previously known metal object to be determined in the coordinate system of the x-ray device using a 2D-3D registration with at least one two-dimensional projection image, after which, for each radiation path of the projection images passing through the metal object, on the basis of attenuation information through the metal object assigned to the model, a proportion of attenuation caused by the metal object for the projection image data item assigned to the radiation path is calculated and is obtained by computation for determination of modified projection images from the projection image data, wherein the three-dimensional image dataset is determined from the modified projection images.

Use is made as part of the present invention of the fact that the properties of metal objects to be found within a patient, for example when these involve implants or the like, are very well known and this is true both in relation to their geometry and also in relation to their radiation attenuation properties. If for example a screw is used in a patient then its dimensions and materials are already known extremely exactly. This makes it possible however to use the background information and create a corresponding three-dimensional model of the metal object, which can be placed in the image space of the three-dimensional image dataset. Since known metal objects to be found in patients have a fixed size and shape, the geometry parameters describing the position and orientation of the model are thus to be used primarily as model parameters. Basically however it is also conceivable to use further model parameters, for example if fluctuations with regard to the attenuation properties are assumed.

The idea is now to find the position and orientation of the model of the metal object which is reproduced by the two-dimensional projection images. To this end a 2D-3D registration with at least one two-dimensional x-ray image is provided, wherein it should already be pointed out at this juncture that at least assuming the cone beam geometry which is used most, a single two-dimensional projection image is already sufficient to determine the orientation and position of the three-dimensional model in the coordinate system of the x-ray device (and thus of the three-dimensional image dataset). The reason for this is the defined and known geometrical dimensions of the metal object.

After the 2D-3D registration the position and orientation of the model in the coordinate system of the x-ray device is thus known, for observation of a number of metal objects, if necessary the orientation and the positions of all these metal objects. However this now makes it possible, since the imaging geometry of each projection image is for example known through projection matrixes determined in a projection run, to determine for the radiation paths assigned to the individual image data (pixels), whether, how and how far they pass through the metal object. In other words this means that for each projection image the measured projection image data (intensity values) are composed from the unknown attenuations of the patient and the defined and known attenuations of the metal object. If it is assumed that the attenuation coefficient is constant everywhere in the metal object and for example is designated as $\mu_{Ip}$, the following equation can be written for the image data for a pixel n, designated as intensity value $I_n$:

$$I_n = I_0 \exp(-\int \mu_{Ip}(E) s_{Ip} dE) \cdot \exp(-\int \mu(s) ds), \quad (1)$$

wherein $I_0$ corresponds to the output intensity of the x-ray emitter, E designates the energy, $S_{Ip}$ describes the path length which the beam path covers through the metal object and $\mu(s)$ describes the unknown attenuation by the patient. Naturally the formula can be described accordingly for a number of different attenuation coefficients within the metal object if this is structured for example. In such cases air-filled areas provided within a plate can be used for the sake of simplicity with an attenuation coefficient of zero. The beam spectrum of the x-ray emitter can also be taken into consideration in the calculations.

From the relationship in (1) it now follows however that a modified item of projection image data, which only describes the unknown attenuation through the patient, can be calculated as $$\tilde{I}_n = I_n \exp(+\int \mu_{Ip}(E) s_{Ip} dE) \quad (2).$$

This thus means that, for each image point (i.e., each pixel) of a projection image, the known attenuation by the metal object can be calculated from the measured item of projection image data. In this case, as also indicated in the formulas, the energy dependence of the attenuation coefficients of the metal object should be taken into consideration. Since this can be carried out for each radiation path of each projection image, modified projection images are obtained as a result, the projection image data of which now only describes the attenuation through the object containing the metal objects, the patient.

With the aid of the attenuation values thus corrected or modified an artifact-minimized reconstruction of the three-dimensional image dataset can be performed, by the reconstruction being based on the modified projection images. The three-dimensional image dataset thus produced initially does not contain the actual metal object (or, for a number of metal objects, the number of metal objects), however orientation and position of the model (and thus of the metal object) in the coordinate system of the x-ray device, i.e. the image space of the three-dimensional image dataset, are already known, so that provision can be made with particular advantage, as a result of the known orientation and position of the model, for an image of the metal object to be inserted into the three-dimensional image dataset.

The inventive method brings a plurality of benefits. Thus a significant reduction of the metal artifacts is possible with the inventive method, since as additional information the geometry of the metal object and of its x-ray attenuation properties known beforehand can also be included in the reconstruction. In addition the inventive method can be implemented easily and without major calculation outlay, especially since it can work directly on the two-dimensional projection data without it being necessary to already use a three-dimensional reconstruction.

In a development of the inventive idea there can be provision for the model to be determined from known geometrical data and/or the attenuation information from previously known material data of the metal object. Since sufficient information about the metal object is present, a suitable model of the metal object specific to the reconstruction task to hand can be created. In this case there can be provision that with an implant, especially a screw and/or a plate and/or a metal object forming at least a part of an artificial joint, the geometrical data and/or the material data are determined from a manufacturer and/or via a database, especially a database of an information system, as the metal object. There can thus be provision for data to be used which is already made available by manufacturers themselves. It is also basically possible for the model to be created on the basis of available information about material composition and about geometry of the implant as a dedicated model by an operator of the x-ray device and made available. Preferably however there is provision for the model to be determined from known geometrical data and material data of the metal object, which itself can be retrieved from databases or information systems respectively. It is also worthwhile keeping the models as a whole in a database, especially a database of an information system. In a typical advantageous embodiment there can be provision that, for an x-ray examination of the patient in a target region, information about implants present in the patient in the target region is retrieved from the information system, for example a hospital information system and/or a radiology information system, especially from an electronic patient file. Accordingly it is now possible to retrieve the model corresponding to the implant or its data from a database, which itself can be stored in the information system. Thus geometry data and data about the material composition of the implant can be determined automatically in order just as automatically to specifically create the three-dimensional model or directly retrieve the stored model of the metal objects needed more often.

It is especially worthwhile here if a model based on finite elements or on a defined, regular grid is used, wherein especially the elements defined by the finite elements and/or the grid is assigned in each case to an item of attenuation information. It is precisely in respect of the calculations to be carried out that such a representation of the model proves to be suitable, since then the beam path through the spatial elements can be considered and corresponding assigned attenuation information can be used. It is especially worthwhile to adapt the actual embodiment of the model to the imaging and reconstruction environment. Thus there can be provision for example for the size of the spatial elements defined by the finite elements and/or the grid to be selected as a function of and/or equal to the voxel size of the three-dimensional image dataset. An equivalence of the order of magnitude is then advantageously already provided. Finite elements can for example be considered "quantized" according to the voxel sizes.

In an especially advantageous development of the present invention there can be provision, for beam hardening information caused by the metal object to be determined from the model known in orientation and position and to be used as part of a beam hardening correction, wherein a distinction is made along a radiation path between structures lying in front of the metal object and behind the metal object. It is thus possible, since orientation position of the model and thus of the metal object as well as its attenuation properties are known, to determine a beam hardening arising through the object as beam hardening information. In addition the orientation and position known from the adapted model after the reconstruction offers the opportunity of establishing which portion of the patient, thus which structures of the patient, lie in front of and which portion lies behind the metal object. This makes it possible however to correct beam hardening effects caused by the metal object. Normal beam hardening corrections basically known in the prior art can be used for this purpose.

As already mentioned, it is possible, because of the cone beam geometry used to particular advantage in the inventive method, to already determine the orientation and the position on the basis of an individual projection image sufficiently accurately as part of the 2D-3D registration. However this also means that even if only a single projection image is present, the radiation paths for this projection image through the metal object can still be determined. The option of also correcting this single projection image also follows on from this however. There can be provision in an advantageous embodiment for the determination of the modified projection image to be undertaken immediately after the recording for each projection image. This means the inventive method can be carried out on the two-dimensional projection image data even while the recording of the projection images is still in progress. This produces an extremely effective use of time.

In a further advantageous embodiment of the present invention there can be provision that, in the determination and evaluation of radiation paths as part of a correction, especially with a beam hardening correction, image information already recorded can be taken into consideration which was recorded from a projection direction deviating from the projection direction of the currently observed projection image, preferably a projection direction rotated by 90° in relation to the projection image of the currently observed projection image. As already mentioned in relation to the example of the beam hardening correction, it is worthwhile to use the known position and orientation of the metal object in order to consider the modified projection image data further in relation to the beam modification by the irradiated tissue, for which purpose especially the spectrum is also taken into consideration or an energy-dependent observation is undertaken. In this case it is worthwhile taking into account image information from another projection direction, since this for example contains information about which soft tissue is located in front of the metal object and which is located behind and the like. A significantly more refined beam path modeling and a significantly more refined correction of the attenuation values is thus conceivable if, where possible, image information from other projection directions is included in the correction steps for determining the modified, corrected projection images. In this case the image information of a further projection image contributing to reconstruction or an additional image recorded in advance can expediently be used which each have a projection direction which differs in each case from the projection direction of the projection image currently being observed. Preferably in this case a difference in the range of 90° is given, for example in the range from 75° to 105°. The additional image can especially be recorded with a lower dose than the projection images used for reconstruction, for example can thus be a fluoroscopy image in order to reduce the dose stress as much as possible.

Such an additional image is frequently created in any event in the normal workflow and can expediently be further evaluated as image information. In this case it is especially advantageous, for a projection direction lying in the central region of a planned imaging trajectory to be used for recording the additional image. For example with a beam angle of 20° this can involve an additional image recorded frontally in relation to the patient, i.e. at 90°, if the imaging trajectory is selected along a circular path which begins laterally at −10° and ends laterally at 190°. Thus an additional image is generally created which is essentially at right angles to the first and last recorded projection images, i.e. corresponds in the projection direction to the mean projection image of the scan series.

Such an additional image, especially only recorded beforehand for support, makes it clear, namely already during the viewing of the first recorded projection image which contributes to the reconstruction with a corresponding projection direction, which tissue layers, seen from the beam source, lie behind the metal object and consequently are affected by the beam hardening, as well is also how they are affected, so that a further refinement of the correction for the modified attenuation values is possible. It should also be noted that exemplary embodiments are conceivable in which, depending on the projection image currently being viewed, both an additional image and also other projection images contributing to the reconstruction are used as image information.

It is further especially preferred if the orientation and position of the model in the projection image viewed immediately beforehand determined as adjacent in relation to the projection direction is used as starting point for the 2D-3D registration with a further projection image. Since adjacent protection images as regards the projection direction only differ very little in their projection angle or generally in the projection direction per se, it is thus possible, as a starting point for a 2D-3D registration, in an adjacent image as regards the projection direction, to transfer this as starting point for the registration into the next image. This means that the 2D-3D registration of the model in the individual projection images can be significantly simplified in that the starting values for the orientation and position of the registration can be given as from the second viewed projection image by the predecessor image, since the spatial deviation between two adjacent projection images can be assumed to be small. Thus a lengthening of the reconstruction time is minimized.

There can further be provision for fine correction to be undertaken by virtual projection images being determined by forward projection from the three-dimensional image dataset with inserted image of the metal object and being compared with the recorded projection images, wherein the image data of the projection images is corrected as a function of the comparison, especially as part of an iterative process. It is also conceivable to subject the projection images to a fine correction once more by virtual projection images being determined by forward projection in which the location of the metal object should coincide with the location of the metal object to be seen in the original projection images and all data values, particularly in the environment of the metal object. This can be checked and if necessary used for fine correction if larger deviations of the image data are still present, so that further improved projection images can be determined. In particular an iterative process can be used in such cases, meaning that, from the further-improved projection images, a three-dimensional image dataset in its turn and from this by forward projection comparison images can be determined.

It is especially advantageous if, in the use of the model now precisely known in its orientation and position as well as its attenuation properties for a multiple reconstruction of three-dimensional image datasets, especially as part of an iterative method, correction information, especially related to the beam modeling and/or taking into account the orientation and position and the attenuation information, is determined and included for correction of the image data. Thus from a comparison of three-dimensional, reconstructed image datasets, correction information usable as part of the fine correction described here can be obtained, especially if a high-resolution model in relation to the attenuation properties is used, for example a model using finite elements or defined on a grid. Then the beam modeling, especially in respect of the forward projection, can be improved by the more detailed orientation and position information and more detailed material information being used. A location- and energy-dependent refinement of the beam modeling is then produced. This process too can naturally be carried out iteratively.

In addition to the method the invention also relates to an x-ray device, comprising a recording arrangement comprising an x-ray emitter and an x-ray detector for recording projection images of a target region from different projection directions and a control device embodied for carrying out an inventive method. All statements made regarding the inventive method can be similarly transferred to the inventive x-ray device, with which the said advantages can thus also be obtained.

This can especially involve a C-arm x-ray device in which the x-ray emitter and the x-ray detector are arranged opposite one another on a C-arm. Metal artifacts more frequently result particularly with such C-arm x-ray devices, if a three-dimensional image dataset is to be derived from two-dimensional projection images.

Other features which are considered as characteristic for the invention are set forth in the appended claims.

Although the invention is illustrated and described herein as embodied in method for correcting artifacts and x-ray device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
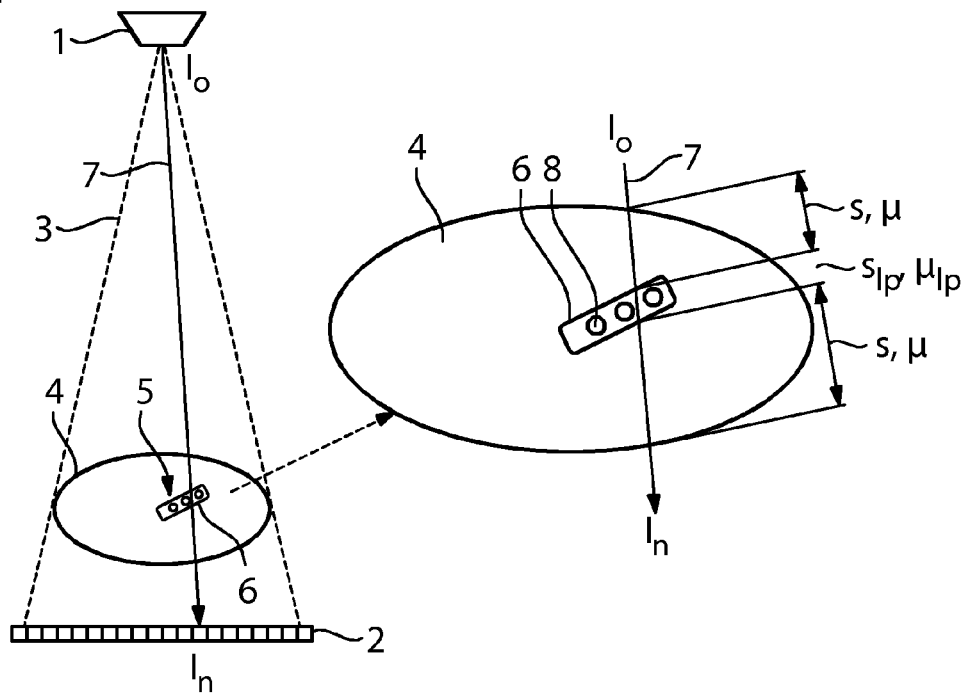
FIG. 1 is a diagram illustrating the recordation of a projection image in cone beam geometry.

Referring now to the figures of the drawing in detail and first, particularly, to FIG. 1 thereof, there is shown a basic diagram for geometry during recording of a projection image with an x-ray device. Shown schematically are an x-ray emitter 1 and an x-ray detector 2 with various detector elements, which correspond to pixels of the projection image. A cone beam geometry is used, as the indicated cone beam 3 shows. The object to be imaged, here a patient 4, is arranged in the beam path between the x-ray emitter 1 and the x-ray detector 2. Arranged within the patient is an implanted plate 6 as the metal object 5.

For each pixel, here each detector element, a radiation path 7 can be constructed from the x-ray emitter 1 to the corresponding detector element, which has presently occurred for the detector element n, at which an image data item (intensity value) $I_n$ is measured. The radiation emanating from the x-ray emitter 1 has an intensity value, which is labeled $I_0$.

Along the radiation path 7 through the patient 4 the x-ray radiation traverses the plate 6 on a path $s_{lp}$. Although the plate 6 also has cavities 8 with air, such a cavity is not traversed in the present example, so that along the path $s_{lp}$ the constant attenuation coefficient $\mu_{lp}$ is produced. The changing attenuation coefficient and the path outside the plate 6 through structures of the patient 4 are shown as abbreviations labeled s and μ.

The attenuation of the x-ray radiation through the patient 4 with the metal object 5 is thus able to be described accordingly by the formula (1) specified above. It follows that the proportion of the metal object 5 in the attenuation can be computed on the basis of the formula (2). Thus if position, orientation and attenuation properties of the metal object 5 in the coordinate system of the x-ray device are known, the formula (2) allows the metal object 5 to be "removed," as it were, for each radiation path (7), so that metal artifacts can be largely avoided or at least greatly reduced in a subsequent reconstruction with modified projection image data.

Thus the method according to the invention is based on a case in which the metal object 5 and its properties, here its geometrical properties as well as the attenuation properties, are known and are mapped within a model. In such cases these types of model can be held in a database for different metal objects, for example as part of an information system, and retrieved when required. To this end it is conceivable to record, from an electric patient file or from registration data for example, which metal objects, here in concrete terms implants, are present in the target region of a patient 4 under examination. Accordingly suitable models can be retrieved and used. It is also conceivable to derive the models explicitly from geometrical data and material data, which itself can originate from databases, wherein it is then sensible to still keep this data in the database for a further occurrence of the metal object 5.

The actual modeling can be selected in such cases so that spatial elements defined by finite elements or a regular grid, the size of which is oriented to the ultimately desired voxel size, are used, to which attenuation information is assigned in each case. It is precisely in an exact modeling of the radiation paths 7 that this has advantages.

Figure 2:
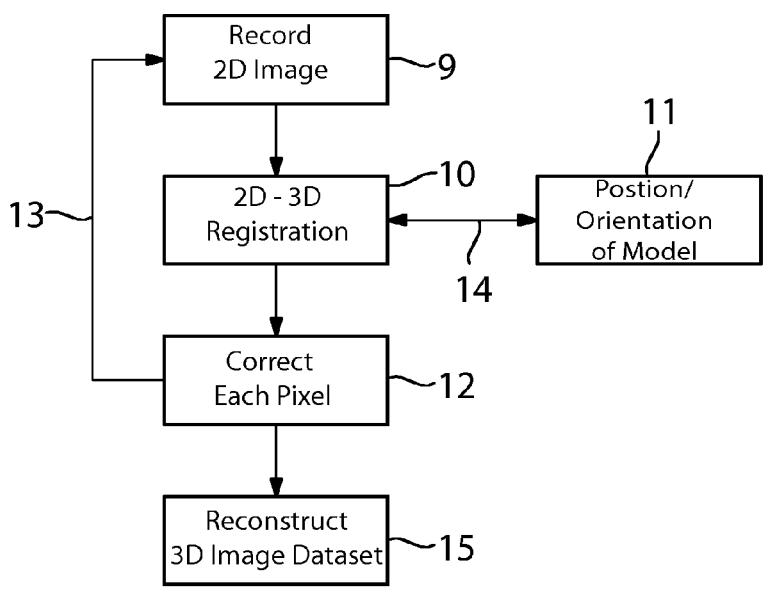
FIG. 2 is a flowchart of a first embodiment of the method according to the invention.

FIG. 2 shows a schematic of a flowchart of a first exemplary embodiment of the method according to the invention.

Since, if necessary as described, the information about existing metal objects 5 in the patient 4 has been procured, a first two-dimensional projection image is recorded in a step 9.

In a step 10 a 2D-3D registration between the projection image and the model then takes place. If a number of metal objects 5 with assigned models are available, this is carried out for all models. The result is the position and orientation of the model in the coordinate system of the x-ray device which are symbolized by the box 11.

If the position and orientation of the model is first known however, then for all radiation paths 7 of the projection image, to what extent and where these paths pass through the metal object is able to be determined. The corresponding correction in accordance with formula (2) takes place for each pixel in step 12.

Thus a single two-dimensional projection image is already sufficient to estimate the orientation and position of the metal object 5 sufficiently well and thus undertake a correction directly on the projection image data.

The method then continues with the recording of the next projection image, by cycling back along the arrow 13. In this case an expedient option is produced in step 10 for the further projection images: since the projection images, at least consecutive projection images are frequently recorded in spatial layers and positions of the x-ray detector 2 and the radiation source 1 which lie very close to those of the previous projection image, orientation and position of the model determined in the previous image can be used as the start position for the new 2D-3D registration in step 10, which is indicated by the double-ended arrow 14. In particular, in each further projection image observed a precise three-dimensional determination of orientation and position of the metal object 5 is possible.

The steps 9, 10 and 12 are repeated for each projection image, so that at the end modified projection images are available, from which the proportions of the metal object 5 are able to be calculated. These modified projection images are now used in a step 15 to reconstruct the three-dimensional image dataset, for example using an algorithm of filtered back projection or an iterative reconstruction algorithm. The result is a three-dimensional dataset showing the target region without the metal object 5. However there can optionally be provision, also as a part of the reconstruction in step 15, for adding in an image of the metal object 5 again since its attenuation properties and position and orientation are actually known. In this way a complete three-dimensional image dataset is obtained which is characterized above all by mapping the environment of the metal object 5 in a more realistic manner, i.e. with fewer artifacts.

In such cases two further options exist in the inventive method as soon as the three-dimensional image dataset is available. On the one hand it is possible to perform a fine correction of the image data of the projection images, in that virtual projection images are created by forward projection in the three-dimensional image dataset showing the map of the metal object 5, which can be compared with the original projection images, so that based on the comparison a further necessary correction can be deduced. This process can be repeated iteratively, wherein the option then exists of also improving the beam modeling by comparing different reconstructed three-dimensional image datasets.

It is also conceivable and there is provision in this exemplary embodiment, if the three-dimensional patient structures or an information about portions of the patient located in front of and behind the metal object are also available, to carry out a hardening correction in that it is established which portion of the patient 4 lies in front of and which portion of the patient 4 lies behind the metal object 5 along the radiation path 7. Since the attenuation properties of the metal object 5 are known 5 the beam hardening by the metal object 5 can also be determined and the portion of the patient 4 on which this has an influence. Accordingly a correction is possible.

It should also be pointed out at this juncture that the beam hardening correction allows a further improvement to be achieved, in that a further additional image not contributing to the reconstruction is taken into account, which in the exemplary embodiment presented here is a fluoroscopy image recorded in a central position of the recording trajectory for the projection images to be used in the reconstruction, for example frontal. This can provide important further information as part of the beam hardening correction as to which portions of the patient lie in front of and which behind the metal object 5, so that this can also be provided on the projection image data.

Figure 3:
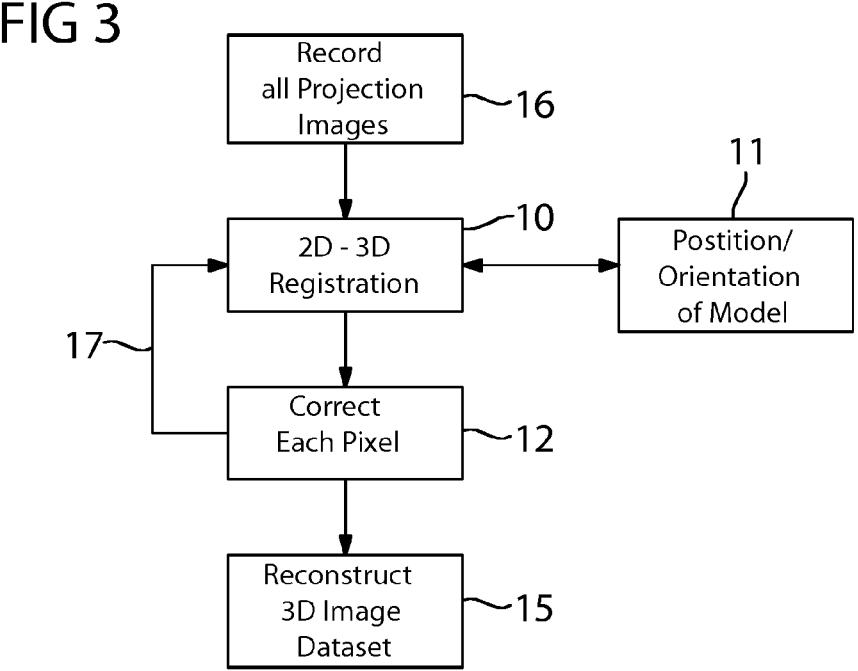
FIG. 3 is a flowchart of a second embodiment of the method according to the invention.

FIG. 3 shows a modified second exemplary embodiment of the inventive method in which initially all projection images are recorded in a step 16. Only when these are all present does the corresponding 2D-3D registration and the corresponding correction 12 take place for the projection images 16 in the step 10. This is, in its turn, undertaken for each projection image in accordance with the arrow 17. It is also conceivable as well to initially carry out the registration completely in step 10 for all projection images in order to achieve a determination which is as exact as possible of position and orientation of the model, so that then the complete correction is undertaken for all projection images in accordance with step 12 with this final orientation and position.

Figure 4:
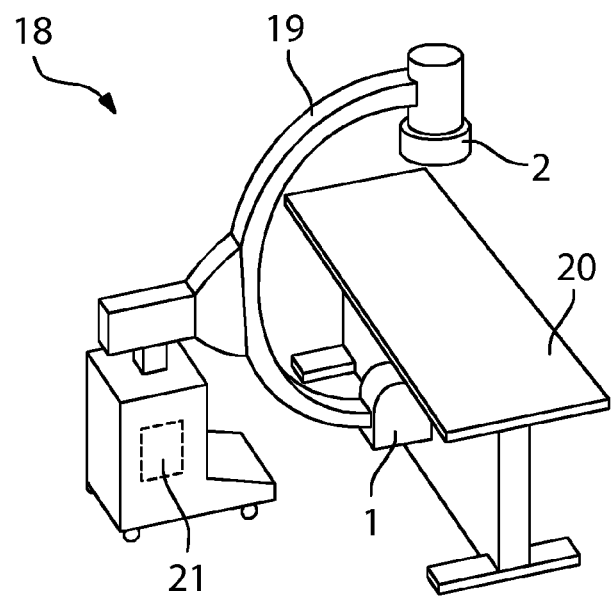
FIG. 4 shows an x-ray device according to the invention.

FIG. 4 finally shows a basic sketch of an inventive x-ray device 18. Mounted opposite one another on a C-arm 19 are the x-ray emitter 1 and the x-ray detector 2, so that they can be bought into different positions in relation to a patient couch 20. This allows projection images to be recorded from different projection directions in that the entire recording assembly consisting of x-ray emitter 1 and x-ray detector 2 is moved along a circular path around the target region. The x-ray device 18 further comprises a control device 21, which is configured for carrying out the method according to the invention, thus enabling metal artifacts to be avoided effectively and by a correction on the two-dimensional projection images themselves.

Although the invention has been illustrated and described in greater detail by the preferred exemplary embodiment, the invention is not restricted by the disclosed examples and other variations can be derived herefrom by the person skilled in the art, without departing from the scope of protection of the invention.

The invention claimed is:

1. A method for correcting artifacts caused by at least one metal object in a target region to be imaged during a reconstruction of a three-dimensional image dataset from a plurality of two-dimensional projection images of the target region recorded from mutually different projection directions with an x-ray device, the method which comprises:
  determining an orientation and a position of a three-dimensional model of the at least one metal object in a coordinate system of the x-ray device by way of a 2D-3D registration with at least one two-dimensional projection image;
  inserting into the three-dimensional image dataset an image of the metal object based on the known orientation and position of the model;
  for each radiation path of the projection images running through the metal object, based on attenuation information through the metal object assigned to the model, calculating a proportion of attenuation through the metal object for the projection image data assigned to the respective radiation path and using a result of the calculation to determine modified projection images from the projection image data and to thereby correct artifacts caused by the metal object in the target region; and
  determining the three-dimensional image dataset from the modified projection images.

2. The method according to claim 1, which comprises carrying out at least one of the following steps: determining the model from previously known geometrical data and determining the attenuation information from previously known material data of the metal object.

3. The method according to claim 2, which comprises, where the metal object is an implant in a patient, determining data selected from the group consisting of the geometrical data and the material data from a manufacturer of the metal object.

4. The method according to claim 3, wherein the metal object is selected from the group consisting of a screw, a plate, and a metal object forming at least one part of an artificial joint, and the geometrical data and material data is acquired from an information system.

5. The method according to claim 2, which comprises, where the metal object is an implant in a patient, determining data selected from the group consisting of the geometrical data and the material data via a database.

6. The method according to claim 1, which comprises using a model selected from the group of models consisting of a model based on finite elements and a model based on a defined, regular grid.

7. The method according to claim 6, wherein spatial elements respectively defined by the finite elements and the grid are each assigned attenuation information.

8. The method according to claim 6, wherein a size of spatial elements respectively defined by the finite elements and the grid is selected with reference to a voxel size in the three-dimensional image dataset.

9. The method according to claim 1, which comprises carrying out at least one of the following steps: determining the model from known geometrical data and determining the attenuation information from known material data of the metal object.

10. The method according to claim 1, which comprises, in determining and evaluating radiation paths during a correction, taking into consideration already-recorded image information, which was recorded from a projection direction differing from the projection direction of a currently observed projection image.

11. The method according to claim 10, wherein the projection direction of the already-recorded image information differs from the projection direction of the currently observed projection image by a 90° rotation.

12. The method according to claim 10, which comprises using image information selected from the group consisting of a further projection image contributing to the reconstruction and an additional image additionally recorded beforehand as the image information.

13. The method according to claim 12, which comprises using the image information of a projection image recorded with a relatively lower radiation dose than the projection images used for reconstruction.

14. The method according to claim 1, wherein, as starting point for the 2D-3D-registration with a further projection image, using an orientation and a position of the model in the projection image observed beforehand determined in the projection image observed immediately beforehand, adjacent as regards the projection direction.

15. A method for correcting artifacts caused by at least one metal object in a target region to be imaged during a reconstruction of a three-dimensional image dataset from a plurality of two-dimensional projection images of the target region recorded from mutually different projection directions with an x-ray device, the method which comprises:

determining an orientation and a position of a three-dimensional model of the at least one metal object in a coordinate system of the x-ray device by way of a 2D-3D registration with at least one two-dimensional projection image;

for each radiation path of the projection images running through the metal object, based on attenuation information through the metal object assigned to the model, calculating a proportion of attenuation through the metal object for the projection image data assigned to the respective radiation path and using a result of the calculation to determine modified projection images from the projection image data and to thereby correct artifacts caused by the metal object in the target region;

determining beam hardening information produced by the at least one metal object from the model known in orientation and position and using the hardening information as part of a beam hardening correction, and thereby making a distinction along a radiation path between structures lying in front of the at least one metal object and structures lying behind the at least one metal object; and determining the three-dimensional image dataset from the modified projection images.

16. A method for correcting artifacts caused by at least one metal object in a target region to be imaged during a reconstruction of a three-dimensional image dataset from a plurality of two-dimensional projection images of the target region recorded from mutually different projection directions with an x-ray device, the method which comprises:

determining an orientation and a position of a three-dimensional model of the at least one metal object in a coordinate system of the x-ray device by way of a 2D-3D registration based on a single two-dimensional projection image;

for each radiation path of the projection images running through the metal object, based on attenuation information through the metal object assigned to the model, calculating a proportion of attenuation through the metal object for the projection image data assigned to the respective radiation path and using a result of the calculation to determine modified projection images from the projection image data and to thereby correct artifacts caused by the metal object in the target region; and determining the three-dimensional image dataset from the modified projection images.

17. The method according to claim 16, which comprises determining the modified projection images for each projection image directly after recording.

18. A method for correcting artifacts caused by at least one metal object in a target region to be imaged during a reconstruction of a three-dimensional image dataset from a plurality of two-dimensional projection images of the target region recorded from mutually different projection directions with an x-ray device, the method which comprises:

determining an orientation and a position of a three-dimensional model of the at least one metal object in a coordinate system of the x-ray device by way of a 2D-3D registration with a least one two-dimensional projection image;

for each radiation path of the projection images running through the metal object, based on attenuation information through the metal object assigned to the model, calculating a proportion of attenuation through the metal object for the projection image data assigned to the respective radiation path and using a result of the calculation to determine modified projection images from the projection image data and to thereby correct artifacts caused by the metal object in the target region;

effecting a fine correction by determining virtual projection images from the three-dimensional image dataset with an inserted image of the metal object through forward projection and comparing with the recorded projection images, wherein the image data of the projection images is corrected as a function of the comparison, optionally with an iterative process; and determining the three-dimensional image dataset from the modified projection images.

19. The method according to claim 18, which comprises, for a multiple reconstruction of three-dimensional image datasets, especially as part of an iterative process, determining correction information, especially related to the beam modeling and taking into account the orientation and position and the attenuation information, and including the correction information for correction of the image data.

20. An x-ray device, comprising:

an imaging arrangement including an x-ray emitter and an x-ray detector for recording projection images of a target region from a plurality of different projection directions; and a control device configured for correcting artifacts caused by at least one metal object in a target region to be imaged during a reconstruction of a three-dimensional image dataset from a plurality of two-dimensional projection images of the target region recorded from mutually different projection directions with said imaging arrangement, by carrying out the following process steps:

determining an orientation and a position of a three-dimensional model of the at least one metal object in a coordinate system of the x-ray device by way of a 2D-3D registration with at least one two-dimensional projection image;

for each radiation path of the projection images running through the metal object, based on attenuation information through the metal object assigned to the model, calculating a proportion of attenuation through the metal object for the projection image data assigned to the respective radiation path and using a result of the calculation to determine modified projection images from the projection image data; and determining the three-dimensional image dataset from the modified projection images.

* * * * *